*J. L. Treat,*
*Cheese Press.*

N⁰ 40,150. Patented Sep. 29, 1863.

Witnesses:
Charles Smith
S. Schuttler

Inventor:
J. L. Treat
By Munn & Co
Attys

UNITED STATES PATENT OFFICE.

JOHN L. TREAT, OF NEW YORK, ASSIGNOR TO HIMSELF AND MARTIN C. MILLER, OF ORISKANY FALLS, N. Y.

IMPROVEMENT IN CHEESE-PRESSES.

Specification forming part of Letters Patent No. 40,150, dated September 29, 1863.

*To all whom it may concern:*

Be it known that I, JOHN L. TREAT, of the city, county, and State of New York, have invented a certain new and Improved Cheese-Press; and I do hereby declare the following to be a full and exact description of the same, reference being had to the accompanying drawings, making part of this specification, in which—

Figure 1:
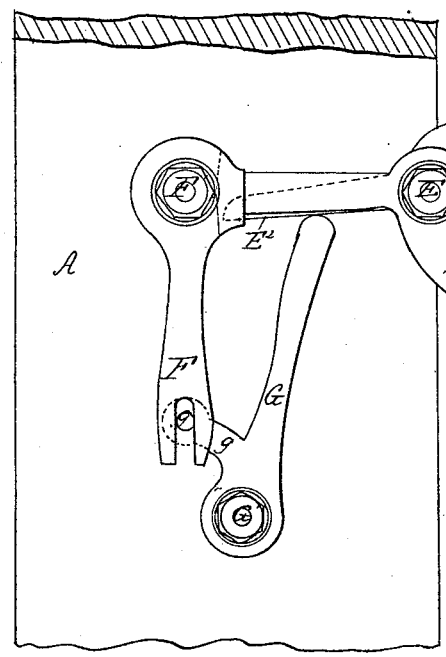
Figure 2:
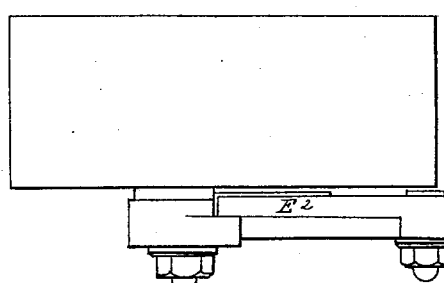

Figure 1 is a side elevation of my improved device, showing the position of the parts when supporting and compressing a cheese. Fig. 2 is a plan or top view of the same.

Similar letters of reference indicate corresponding parts in the several figures.

The subject of this invention is a cheese-press, whereby the original shape and consistency of the cheese, on being removed from the mold, may be preserved until it has become sufficiently firm and solid to render any further compression unnecessary.

The invention consists in a certain combination and arrangement of mechanical devices by which the weight of the cheese (used as the prime motor of said mechanism) may be more effectually and advantageously employed in compressing itself.

To enable others skilled in the art to which my invention appertains to fully understand and use the same, I will proceed to describe its construction and operation.

In the accompanying illustration, A is a wooden frame or standard, to which is pivoted at B' an arm or platform, B, in the outer end of which is fitted a disk, C, on which the cheese (indicated by the letter D) is to be placed and supported. The outer portion of the said arm or support B is so formed, as clearly shown in Fig. 1, as to constitute the under jaw of a clamp, the upper jaw, E, of which is pivoted at E' to the arm B.

E² represents an arm or extension of the jaw E, the form of which is represented by dotted outline in Fig. 1, and the object of which will be hereinafter explained.

Formed upon or rigidly attached to the arm B, at right angles therewith, and projecting downward therefrom, is a forked arm, F.

G is a lever extending in an obliquely-upward direction, and fulcrumed or pivoted at G' on the standard A. This lever G is provided with an arm, g, near its lower or pivoted end, upon which is formed or attached a pin, g', working between the prongs on the end of the arm or lever F.

From the foregoing description it will be apparent that the arms B F constitute together an angular lever fulcrumed at B' on the standard A. The jaw E and arm E² constitute a lever fulcrumed at E' on the arm B, and the arms G g constitute a compound lever fulcrumed at G on the standard A.

Operation: The cheese is evenly deposited upon the disk C, and a similar disk inserted between the top of said cheese and the end of the jaw E. The arm or platform B is thus slightly depressed, which causes the lever F to move in a backward direction, thereby transmitting motion to the lever or arm G through the medium of the pin g' on the arm g, working in the slotted end of the lever F. The motion thus imparted to the lever G causes it to approach a vertical position, and this movement is continued until its upper end comes in contact with the arm or extension E² of the jaw E, which arm it immediately elevates until the said jaw E is pressed firmly against the disk covering the cheese, when the parts remain at rest. The pressure exerted upon the cheese may be regulated by varying the length of the lever G, the leverage of the jaw E being increased or diminished according as said lever G is allowed to come in contact therewith at a point a greater or less distance from its fulcrum E'.

The invention may readily be so modified as to adapt it for the original pressing of the cheese. This can be done by placing the common cheese-hoop with its inclosed heads between the clamp-jaws B E, and placing beneath the end of the jaw E blocks of sufficient thickness to keep the said jaw from contact with the hoop in customary manner. The hoop being filled with curd, the jaw E descends and presses or molds it into the desired shape. The cheese may be removed, when desired, by slightly drawing or pressing down the lever G. The pressure being thus removed from the arm of the jaw E, the cheese may be taken from its seat upon the support or platform B.

Having thus described my invention, what

I claim as new therein, and desire to secure by Letters Patent, is—

The combination of the three levers B F, E E², and G g, constructed in the manner described, the first two forming clamp-jaws, and the whole operating together to constitute an automatic press, as and for the purpose specified.

The above specification of my improved cheese-press signed this 8th day of August, 1863.

J. L. TREAT.

Witnesses:
JAMES H. GRIDLEY,
CHARLES SMITH.